US012278933B2

(12) United States Patent
Kashiwagi (10) Patent No.: US 12,278,933 B2
(45) Date of Patent: Apr. 15, 2025

(54) INFORMATION PROCESSING APPARATUS, NON- TRANSITORY COMPUTER READABLE MEDIUM STORING PROGRAM AND INFORMATION PROCESSING METHOD FOR PERSONALIZED COLLABORATION IN SHARED DIGITAL WORKSPACES

(71) Applicant: FUJIFILM Business Innovation Corp., Tokyo (JP)

(72) Inventor: Naoto Kashiwagi, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 590 days.

(21) Appl. No.: 17/385,309

(22) Filed: Jul. 26, 2021

(65) Prior Publication Data
US 2022/0286570 A1   Sep. 8, 2022

(30) Foreign Application Priority Data

Mar. 2, 2021   (JP) ................................ 2021-032848

(51) Int. Cl.
*H04N 1/00*   (2006.01)
(52) U.S. Cl.
CPC ..... *H04N 1/00511* (2013.01); *H04N 1/00424* (2013.01); *H04N 1/00432* (2013.01); *H04N 1/00506* (2013.01); *H04N 1/00514* (2013.01)
(58) Field of Classification Search
CPC ........... H04N 1/00511; H04N 1/00424; H04N 1/00432; H04N 1/00506; H04N 1/00514; G06F 3/0481; G06F 3/0482; G06F 3/0483; G06F 3/04817; G06Q 10/101; H04L 65/403
See application file for complete search history.

(56) References Cited

U.S. PATENT DOCUMENTS

| 10,664,772 B1 * | 5/2020 | Poel .................... G06F 3/04842 |
| 2004/0113941 A1 | 6/2004 | Sliwa et al. |
| 2005/0108651 A1 * | 5/2005 | Kitajima .............. H04N 1/0035 715/764 |
| 2009/0249224 A1 | 10/2009 | Davis et al. |

(Continued)

FOREIGN PATENT DOCUMENTS

| JP | 2004-192641 A | 7/2004 |
| JP | 2011-520172 A | 7/2011 |
| WO | 02/17115 A2 | 2/2002 |

OTHER PUBLICATIONS

Feb. 1, 24, 2022 Extended European Search Report issued in European Patent Application No. 21192773.6.

(Continued)

*Primary Examiner* — Juan M Guillermety
(74) *Attorney, Agent, or Firm* — Oliff PLC (57) ABSTRACT

An information processing apparatus includes a processor configured to display, on a display screen of a terminal device used by a user: a shared work region as a common work region that is accessed by plural users and that enables the plural users to execute work in cooperation; and an operation element for the user using the terminal device to input an instruction related to work in the shared work region, in which the processor is configured to display the operation element of a different type according to the user.

11 Claims, 10 Drawing Sheets

(56) References Cited

U.S. PATENT DOCUMENTS

| | | | | |
|---|---|---|---|---|
| 2010/0192107 A1* | 7/2010 | Takahashi | ............... | G06Q 10/10 715/856 |
| 2016/0299676 A1* | 10/2016 | Yoon | ..................... | G06F 3/0482 |
| 2018/0309742 A1* | 10/2018 | Kato | ....................... | G06F 21/31 |
| 2019/0265941 A1* | 8/2019 | Baba | ..................... | G06F 16/955 |
| 2020/0104024 A1* | 4/2020 | Baba | ..................... | H04N 7/152 |
| 2020/0319778 A1* | 10/2020 | Lewbel | .................. | H04L 65/75 |
| 2021/0048971 A1* | 2/2021 | Tatezono | ............ | H04L 65/4015 |
| 2021/0117050 A1* | 4/2021 | Lewbel | ................ | G06F 3/0482 |

OTHER PUBLICATIONS

Nov. 5, 2024 Office Action issued in Japanese Patent Application No. 2021-032848.
Aug. 27, 2024 Office Action issued in Japanese Patent Application No. 2021-032848.

* cited by examiner

| USER ID | DISPLAY MODE OF PERSONAL OPERATION BUTTON | TYPE OF PERSONAL OPERATION BUTTON | TYPE OF PERSONAL WORK REGION BUTTON |
|---|---|---|---|
| U0001 | PERSONAL TOOLBAR | ASSIGN APPROVAL STAMP "SATOU" AND DISPLAY PERSONAL MEMORANDUM | ASSIGN APPROVAL STAMP "SATOU" AND DISPLAY PERSONAL MEMORANDUM |
| U0002 | PERSONAL TOOLBAR | ASSIGN APPROVAL STAMP "SUZUKI" | ASSIGN APPROVAL STAMP "SUZUKI" |
| U0003 | NON-DISPLAY | ASSIGN APPROVAL STAMP "TAKAHASHI" AND DISPLAY MEMORANDUM | ASSIGN APPROVAL STAMP "TAKAHASHI" |
| ... | ... | ... | ... |

INFORMATION PROCESSING APPARATUS, NON-TRANSITORY COMPUTER READABLE MEDIUM STORING PROGRAM AND INFORMATION PROCESSING METHOD FOR PERSONALIZED COLLABORATION IN SHARED DIGITAL WORKSPACES

CROSS-REFERENCE TO RELATED APPLICATIONS

This application is based on and claims priority under 35 USC 119 from Japanese Patent Application No. 2021-032848 filed on Mar. 2, 2021.

BACKGROUND

Technical Field

The present disclosure relates to an information processing apparatus, a non-transitory computer readable medium storing a program causing a computer to execute an information processing and an information processing method.

Related Art

Patent Literature 1 discloses a device that enables a user to customize a user interface (UI) including operation buttons, tabs, and the like displayed on a display screen, and that distributes the customized UI to plural users so that the plural users may share the customized UI.

CITATION LIST

Patent Literature

Patent Literature 1: JP-A-2004-192641

SUMMARY

In the related art, a shared work region is provided to plural users. The shared work region is a shared work region that may be accessed by the plural users and in which the plural users may execute work in cooperation. When a user accesses such a shared work region, a shared operation element used by the plural users in a shared manner and used by each user to input a processing command is displayed on a display screen of each terminal device used by each user. Each user may input a processing command in the shared work region by operating the shared operation element.

Here, in working in the shared work region, the user may want to use an operation element other than the shared operation element. In this case, when an operation element other than the shared operation element is not displayed on a display screen of the shared work region, there is a problem that the user operation before using of an operation element other than the shared operation element in the shared work region becomes complicated.

As an example, a case is considered where some user (referred to as a user A) needs to perform work specific to the user A in a shared work region for performing work related to an electronic document. Although not limited to this, it is assumed that the work specific to the user A is, for example, to assign a stamp bearing a name of the user A to the electronic document. The stamp is an object to be assigned to an electronic document.

In order to perform the work specific to the user A, the user A may operate an operation element associated with processing related to the work. However, there is a situation in which it is difficult to display the operation element related to the work specific to the user A in a shared work region as a shared operation element. That is, if such an operation element is displayed in the shared work region as a shared operation element, the work specific to the user A may be performed by a user other than the user A.

Therefore, the operation element related to the work specific to the user A needs to be displayed, as an operation element other than the shared operation element, in a personal work region that may be used exclusively by the user A. Then, since the user A may not perform the work specific to the user A in the shared work region, the user A needs to move the electronic document to his/her personal work region and then operate the operation element displayed in the personal work region to perform the work specific to the user A.

Aspects of non-limiting embodiments of the present disclosure relate to reduction of the number of operations performed by a user before an operation element other than a shared operation element is used in a shared work region, which is a common work region, as compared with a case where the operation element other than the shared operation element shared between users is not displayed in the shared work region.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to display, on a display screen of a terminal device used by a user, a shared work region as a common work region that is accessed by plural users and that enables the plural users to execute work in cooperation, and an operation element for the user of the terminal device to input an instruction related to work in the shared work region, in which the processor is configured to display the operation element of a different type according to the user.

BRIEF DESCRIPTION OF THE DRAWINGS

Exemplary embodiment(s) of the present invention will be described in detail based on the following figures, wherein.

DETAILED DESCRIPTION

Figure 1:
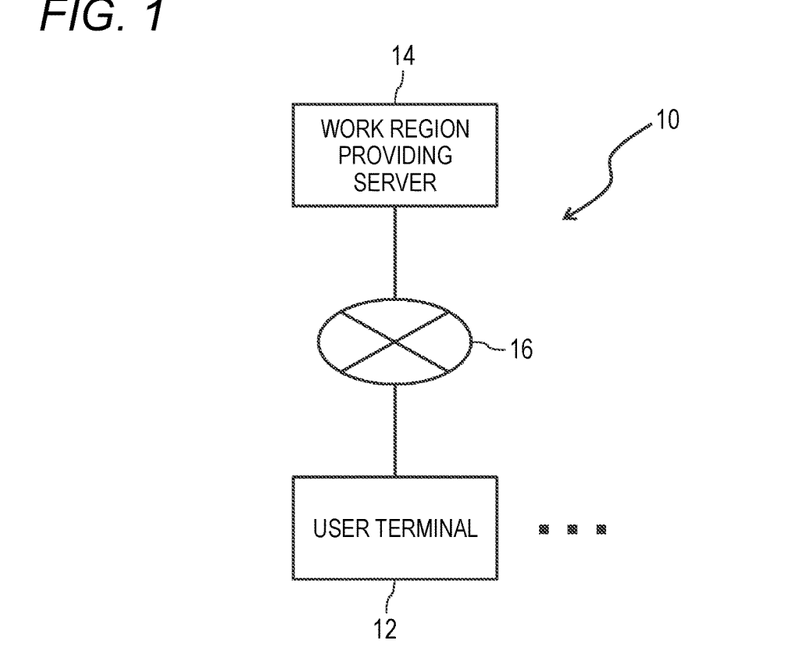
FIG. 1 is a schematic configuration diagram of an information processing system according to a present exemplary embodiment.

FIG. 1 is a schematic configuration diagram of an information processing system 10 according to a present exemplary embodiment. The information processing system 10 includes plural user terminals 12 serving as terminal devices used by users, and a work region providing server 14 serving as an information processing apparatus. The user terminal 12 and the work region providing server 14 are communicably connected to each other via a communication line 16 including, for example, the Internet line or a local area network (LAN). As will be described in detail later, the information processing system 10 is a collaborative work system in which plural users accesses the work region providing server 14 from the user terminal 12, and thus work may be executed in cooperation in a shared work region. In particular, in the present exemplary embodiment, in the information processing system 10, plural users cooperatively executes processing related to an electronic document in the shared work region. The electronic document processed in the information processing system 10 may be managed by the work region providing server 14. That is, the information processing system 10 may be a document management system that manages an electronic document.

Figure 2:
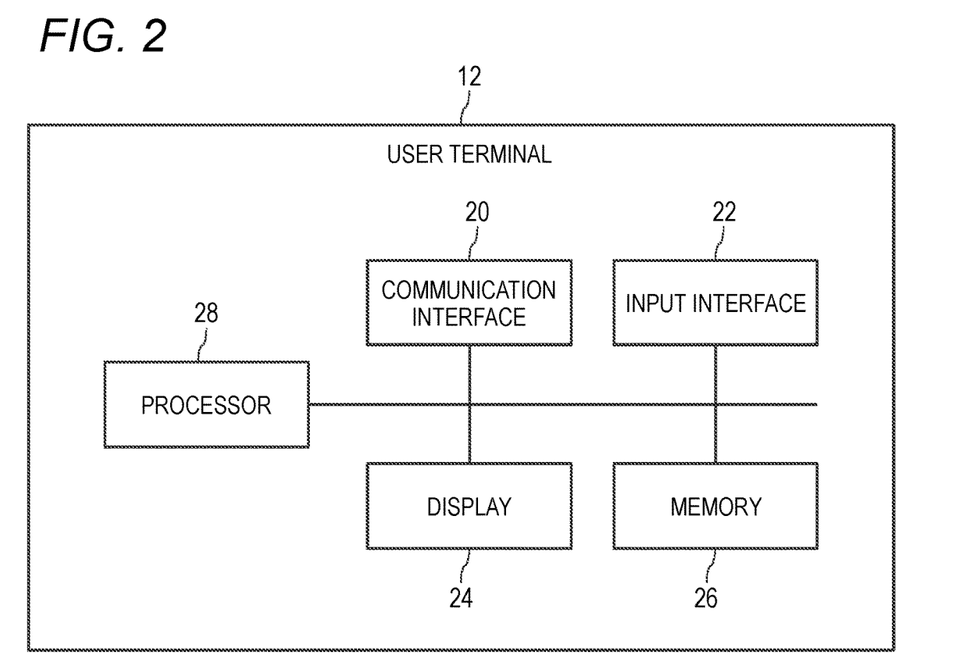
FIG. 2 is a schematic configuration diagram of a user terminal.

FIG. 2 is a schematic configuration diagram of the user terminal 12. The user terminal 12 is, for example, a personal computer or a tablet terminal such as a smartphone. Alternatively, the user terminal 12 may be a computer of any type as long as functions described below are implemented.

A communication interface 20 includes, for example, a network adapter. The communication interface 20 implements a function of communicating with the work region providing server 14 via the communication line 16.

An input interface 22 includes, for example, a touch panel, a button, a mouse, or a keyboard. The input interface 22 is used to input a user instruction to the user terminal 12.

A display 24 includes, for example, a liquid crystal panel. Various display screens are displayed on the display 24. In particular, a display screen of a shared work region and a display screen of a personal work region (both will be described in detail later) that are provided from the work region providing server 14 are displayed on the display 24.

A memory 26 includes, for example, a hard disk drive (HDD), a solid state drive (SSD), an embedded multi media card (eMMC), a read only memory (ROM), or a random access memory (RAM).

A processor 28 refers to hardware in a broad sense. Examples of the processor include at least one of general-purpose processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). The processor 28 is broad enough to encompass one processor or plural processors in collaboration that are located physically apart from each other but may work cooperatively. The processor 28 controls each unit of the user terminal 12.

Figure 3:
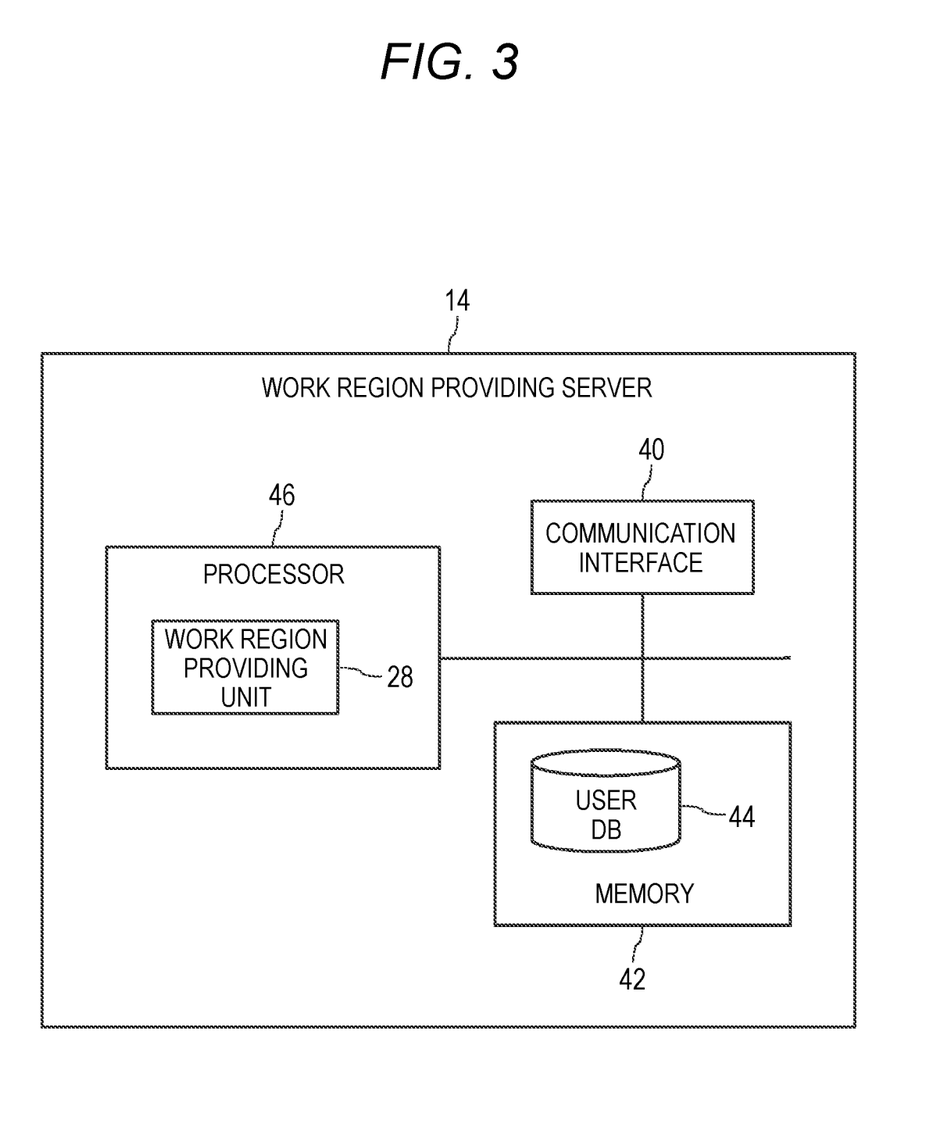
FIG. 3 is a schematic configuration diagram of a work region providing server.

FIG. 3 is a schematic configuration diagram of the work region providing server 14. The work region providing server 14 is configured with, for example, a server computer or the like.

A communication interface 40 includes, for example, a network adapter. The communication interface 40 implements a function of communicating with the user terminal 12 via the communication line 16.

A memory 42 includes, for example, an HDD, an SSD, an eMMC, a ROM, a RAM, or the like. The memory 42 stores an information processing program for causing each unit of the work region providing server 14 to function. In addition, the memory 42 stores a resource as a shared work region and a resource as a personal work region. Further, the memory 42 stores an electronic document processed in the shared work region or the personal work region. In addition, as illustrated in FIG. 3, the memory 42 stores a user DB 44. Content of the user DB 44 will be described later.

A processor 46 refers to a processor in a broad sense. Examples of the processor include at least one of general-purpose processors (e.g., CPU) and dedicated processors (e.g., GPU, ASIC, FPGA, and programmable logic device). The processor 46 is broad enough to encompass one processor or plural processors in collaboration that are located physically apart from each other but may work cooperatively. The processor 46 functions as a work region providing unit 48 in accordance with the information processing program stored in the memory 42.

The work region providing unit 48 authenticates a user registered in advance by authentication processing, and then provides a shared work region to the authenticated user. The shared work region is a common work region that is accessed by plural users and in which plural users may execute work in cooperation. Specifically, the shared work region is a resource on the Internet, and when plural users access the resource, the plural users may cooperatively execute work on the resource.

The work region providing unit 48 may also provide a personal work region to an authenticated user. The personal work region is a work region dedicated to an individual user. That is, the personal work region is provided for an individual user, and the individual user may access only his/her own personal work region and cannot access a personal work region of another individual user. The personal work region is also a resource on the Internet, and a user corresponding to the resource may execute work on the resource by accessing the resource.

In the present exemplary embodiment, a user may execute work related to an electronic document in a shared work region or a personal work region. The electronic document to be worked on in the shared work region or the personal work region is an electronic document transmitted from each user terminal 12 to the work region providing server 14 and stored in the memory 42 of the work region providing server 14. In the present exemplary embodiment, the shared work region or the personal work region is a region in which work related to an electronic document is performed, but the shared work region or the personal work region according to the present disclosure is not limited to a region in which work related to an electronic document is performed. For example, the shared work region or the personal work region may be a region in which plural users cooperatively executes work related to image data or music data.

The work region providing unit 48 provides a user with a shared work region or a personal work region according to selection of the user. Specifically, in accordance with an access destination of a user who logs in to the work region providing server 14, the work region providing unit 48 causes the display 24 of the user terminal 12 used by the user to display a shared work region window, which is a display screen related to a shared work region, or a personal work region window, which is a display screen related to a personal work region. The shared work region window and the personal work region window are "places" where the user executes work on an electronic document. In the present specification, displaying a shared work region window (or a personal work region window) on the display 24 may be expressed simply as displaying a shared work region (or a personal work region) on the display 24. In addition, the work region providing unit 48 causing the display 24 of the user terminal 12 to display any display screen means that the work region providing unit 48 transmits a display instruction related to the display screen to the user terminal 12 to cause the processor 28 of the user terminal 12 to display the display screen on the display 24.

Figure 4:
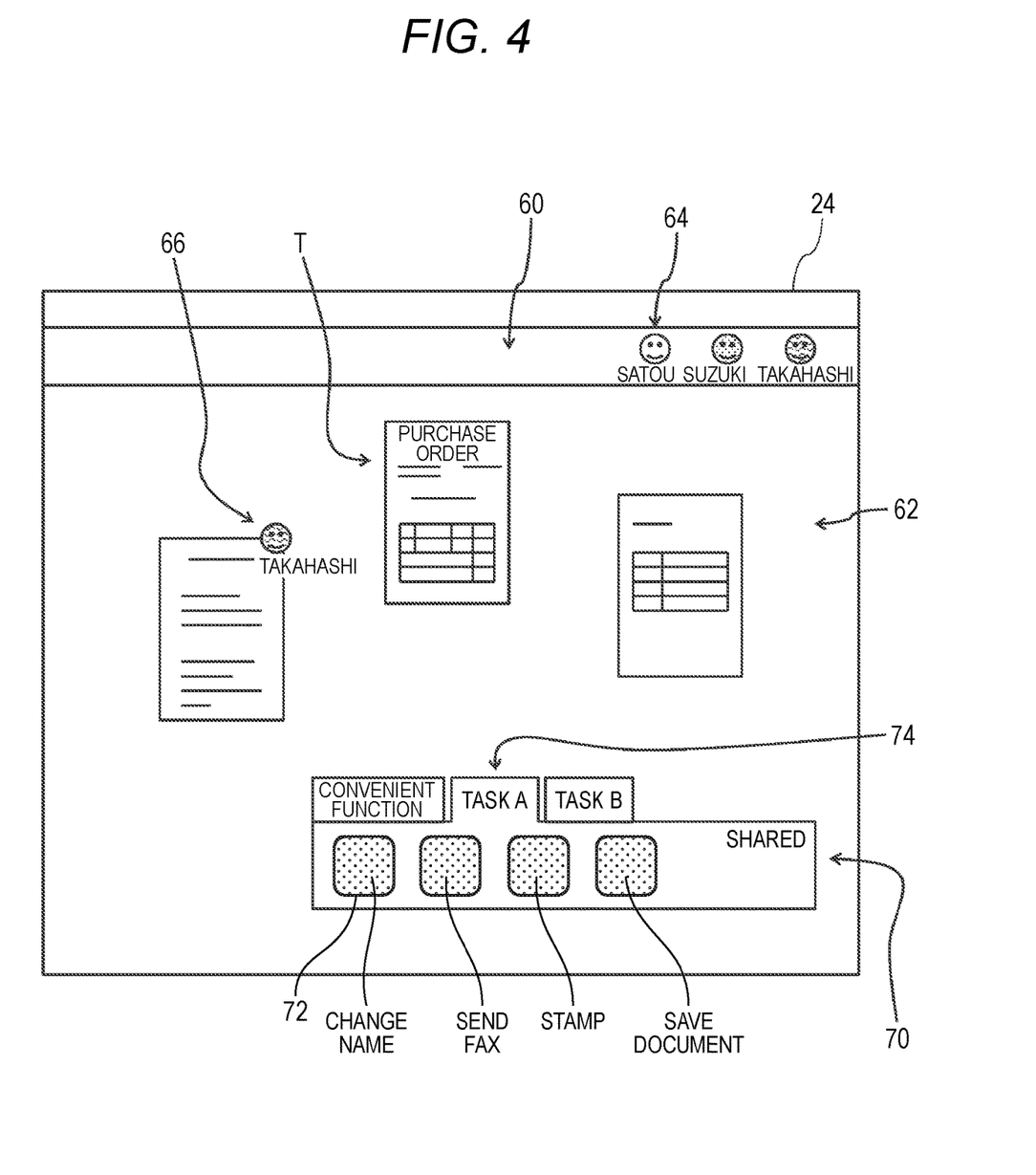
FIG. 4 is a diagram illustrating a display example of a shared work region window and a shared toolbar.

Hereinafter, a display screen displayed on the display 24 of the user terminal 12 when a user accesses a shared work region will be described. FIG. 4 is a diagram illustrating a display example of a shared work region window 60 and a shared toolbar 70 on the display 24 of the user terminal 12. The shared work region window 60 is shared by plural users except for some exceptions. That is, when plural users access the shared work region from plural user terminals 12, the shared work region windows 60 having the same content are displayed on the respective displays 24 of the plural user terminals 12.

The shared work region window 60 includes a document display region 62. In the document display region 62, a thumbnail T related to an electronic document to be worked on in the shared work region is displayed. For example, a thumbnail T of one electronic document may be displayed in the document display region 62, or a thumbnail T of a binder in which plural electronic documents are collected may be displayed in the document display region 62. In the document display region 62, a thumbnail T related to an electronic document selected by a user is displayed in accordance with an instruction from the user who accesses the shared work region.

When the user operates (for example, clicks) the thumbnail T, an edit screen for editing the electronic document corresponding to the thumbnail T is displayed on the display 24 of the user terminal 12 of the user. In the present exemplary embodiment, as an exception to sharing of the shared work region window 60 between plural users, the edit screen of the electronic document is not shared by the plural users but may be viewed only by a user who opens the edit screen. The edit screen may also be shared by plural users.

In addition, the shared work region window 60 displays icons 64 indicating plural users who are accessing the shared work region (in other words, who are working in cooperation in the cooperative work region). Each icon 64 includes information allowing identifying each user, such as a name of each user. According to the icon 64, each user may grasp who is accessing the shared work region in addition to his/her own.

When a user operates the thumbnail T to open an edit screen of an electronic document, an icon 66 indicating the user is displayed in association with the thumbnail T of the electronic document. In the present exemplary embodiment, as illustrated in FIG. 4, the icon 66 is displayed in the vicinity of the thumbnail T or superimposed on the thumbnail T. Accordingly, another user may grasp who opens the edit screen of the electronic document related to the thumbnail T.

In addition, the work region providing unit 48 displays the shared toolbar 70 on the display 24 of the user terminal 12 together with the above-described shared work region window 60. The shared toolbar 70 includes one or more shared operation buttons 72 as shared operation elements. The shared operation button 72 is an operation element for plural users to input an instruction related to work in the shared work region. Specifically, processing related to an electronic document is associated with the shared operation button 72, and when a user operates the shared operation button 72, an instruction command for executing processing corresponding to the shared operation button 72 is input to the work region providing unit 48. The work region providing unit 48 executes the processing related to the electronic document in accordance with the instruction command.

The shared toolbar 70 may include plural tabs 74. One tab 74 includes one or more shared operation buttons 72. A user may select one tab 74 from among plural tabs 74. The shared operation button 72 in the tab 74 selected by the user is displayed, and the shared operation button 72 in the tab 74 that is not selected by the user is not displayed. By dividing plural shared operation buttons 72 into plural tabs 74, display area of the shared toolbar 70 including a large number of shared operation buttons 72 is reduced, and visibility of the shared work region window 60 is improved. In addition, for example, plural shared operation buttons 72 associated with the same type of instruction command are put together in one tab 74, or plural shared operation buttons 72 that are highly likely to be used in the same task are put together in one tab 74, so that each user may efficiently operate the shared operation button 72.

The shared toolbar 70 (that is, the shared operation button 72) is shared and used by plural users who access the shared work region. Therefore, the same shared toolbars 70 are displayed on the respective displays 24 of the user terminals 12 used by plural users who access the same shared work region.

The work region providing unit 48 may change content of the shared toolbar 70 in accordance with an instruction from each user. For example, the work region providing unit 48 may add the shared operation button 72 to the shared toolbar 70, delete the shared operation button 72 from the shared toolbar 70, change the shared operation button 72 in the shared toolbar 70 to another shared operation button 72 associated with another instruction command, change a title of the tab 74, and move the shared operation button 72 in one tab 74 to another tab 74. Since the shared toolbar 70 is shared by plural users, changed content of the shared toolbar 70 according to an instruction of a certain user is reflected to all the other users. In other words, when the content of the shared toolbar 70 is changed by a first user, the shared toolbar 70 whose content is changed by the first user is displayed on the user terminal 12 of a second user, who is another user, when the second user accesses the shared work region.

In the present exemplary embodiment, non-display of the shared toolbar 70 (that is, the shared operation button 72) is not enabled. However, the display and non-display of the shared toolbar 70 may be switched for each user in accordance with an instruction from the user.

Figure 5:
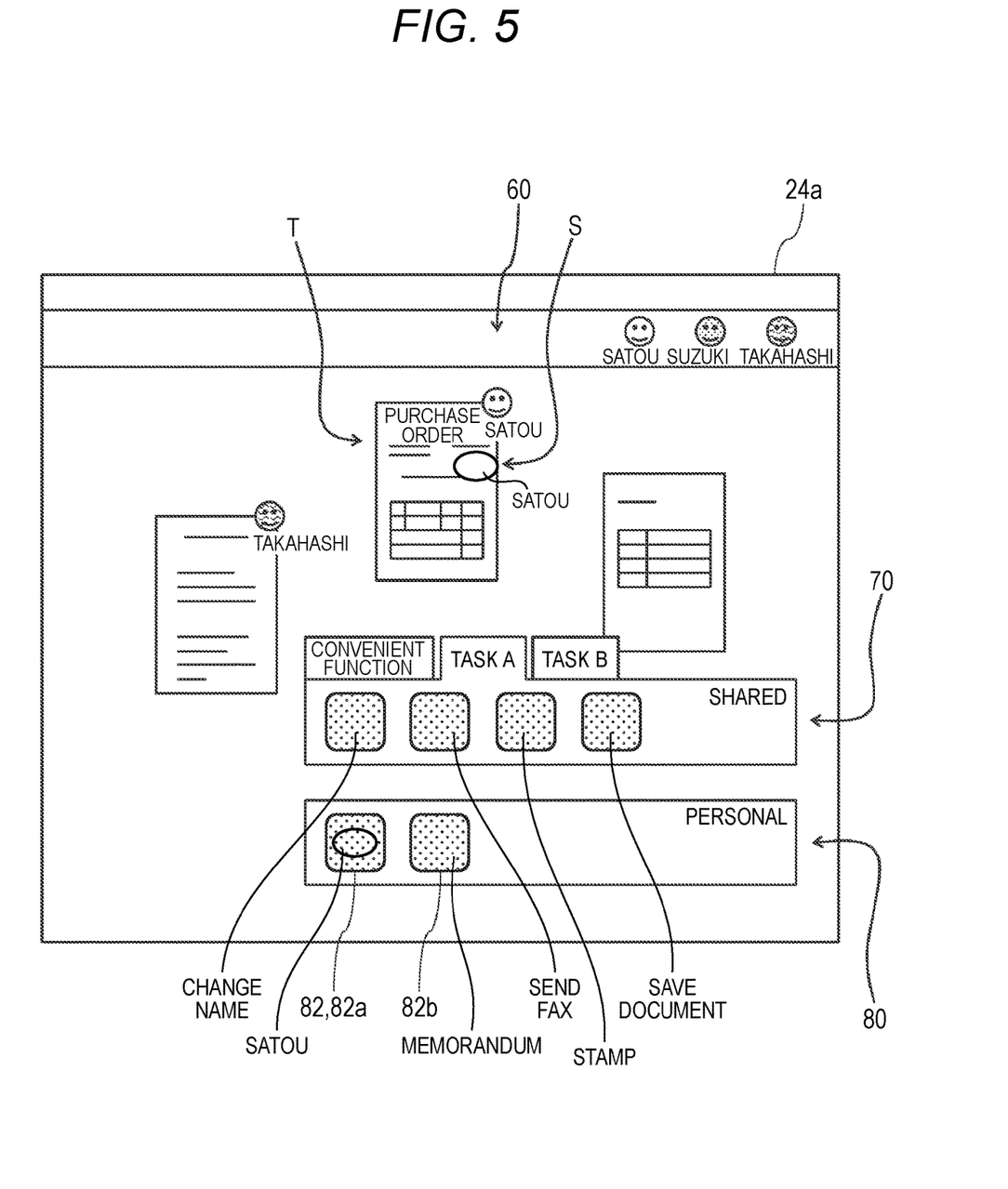
FIG. 5 is a diagram illustrating a display example of a shared work region window, a shared toolbar, and a personal toolbar in a first user terminal used by a first user.

FIG. 5 is a diagram illustrating a display example of the shared work region window 60, the shared toolbar 70, and a personal toolbar 80 on a display 24a of the user terminal 12 used by the first user. The work region providing unit 48 may display the personal toolbar 80 on the display 24a together with the shared work region window 60 and the shared toolbar 70 described above. The personal toolbar 80 includes one or more personal operation buttons 82 as personal operation elements. Similarly to the shared toolbar 70, the personal toolbar 80 may also include plural tabs. The personal operation button 82 is an operation element for the user to input an instruction related to work in the shared work region. Various types of processing related to an electronic document are associated with the personal operation buttons 82, and when the user operates one personal operation button 82, an instruction command for executing processing corresponding to the personal operation button 82 is input to the work region providing unit 48, and the work region providing unit 48 executes the processing related to the electronic document in accordance with the instruction command.

Unlike the shared toolbar 70 (that is, the shared operation button 72), the personal toolbar 80 (that is, the personal operation button 82) is not shared by plural users who access the shared work region, and is used exclusively by one user. Therefore, even if the first user and the second user access the same shared work region, the personal toolbar 80 for the first user is displayed only on the display 24a of the user terminal 12 of the first user, and is not displayed on the display 24 of the user terminal 12 of the second user.

Each user may determine content of processing associated with his/her personal operation button 82 by himself/herself. In other words, in accordance with an instruction from a user, the work region providing unit 48 may determine content of an instruction input by the personal operation button 82 of the user. Since the personal toolbar 80 is not shared by plural users, the personal toolbar 80 may include the personal operation button 82 associated with processing related to work specific to a user who uses the personal toolbar 80 (hereinafter, the work may be referred to as a "personal task"). For example, as processing related to work specific to the first user using the personal toolbar 80, the personal toolbar 80 illustrated in FIG. 5 includes a personal operation button 82a associated with processing of assigning a stamp (an object to be assigned to an electronic document) bearing a name of the first user to an electronic document, and a personal operation button 82b associated with processing of opening a memorandum related to processing on the electronic document that is edited in advance by the first user. Since the personal operation buttons 82a and 82b are not displayed on the display 24 of the user terminal 12 of a user other than the first user, there is no concern that the stamp bearing the name of the first user is assigned to an electronic document by another user, and there is no concern that the memorandum of the first user is seen by another user.

Since each user determines the content of processing associated with his/her own personal operation button 82, the work region providing unit 48 may cause the display 24 of the user terminal 12 of each user to display different types of personal operation buttons 82 for plural users. The different types of personal operation buttons 82 mean the personal operation buttons 82 associated with different types of processing. For example, as illustrated in FIG. 5, the display 24a of the user terminal 12 of the first user displays, together with the shared work region window 60, the personal operation button 82a associated with the processing of assigning the stamp bearing the name of the first user to an electronic document, and the personal operation button 82b associated with the processing of opening the memorandum of the first user, and as illustrated in FIG. 6, a display 24b of the user terminal 12 of the second user accessing the same shared work region displays, together with the shared work region window 60, a personal operation button 82c associated with processing of assigning a stamp bearing a name of the second user to an electronic document.

Figure 6:
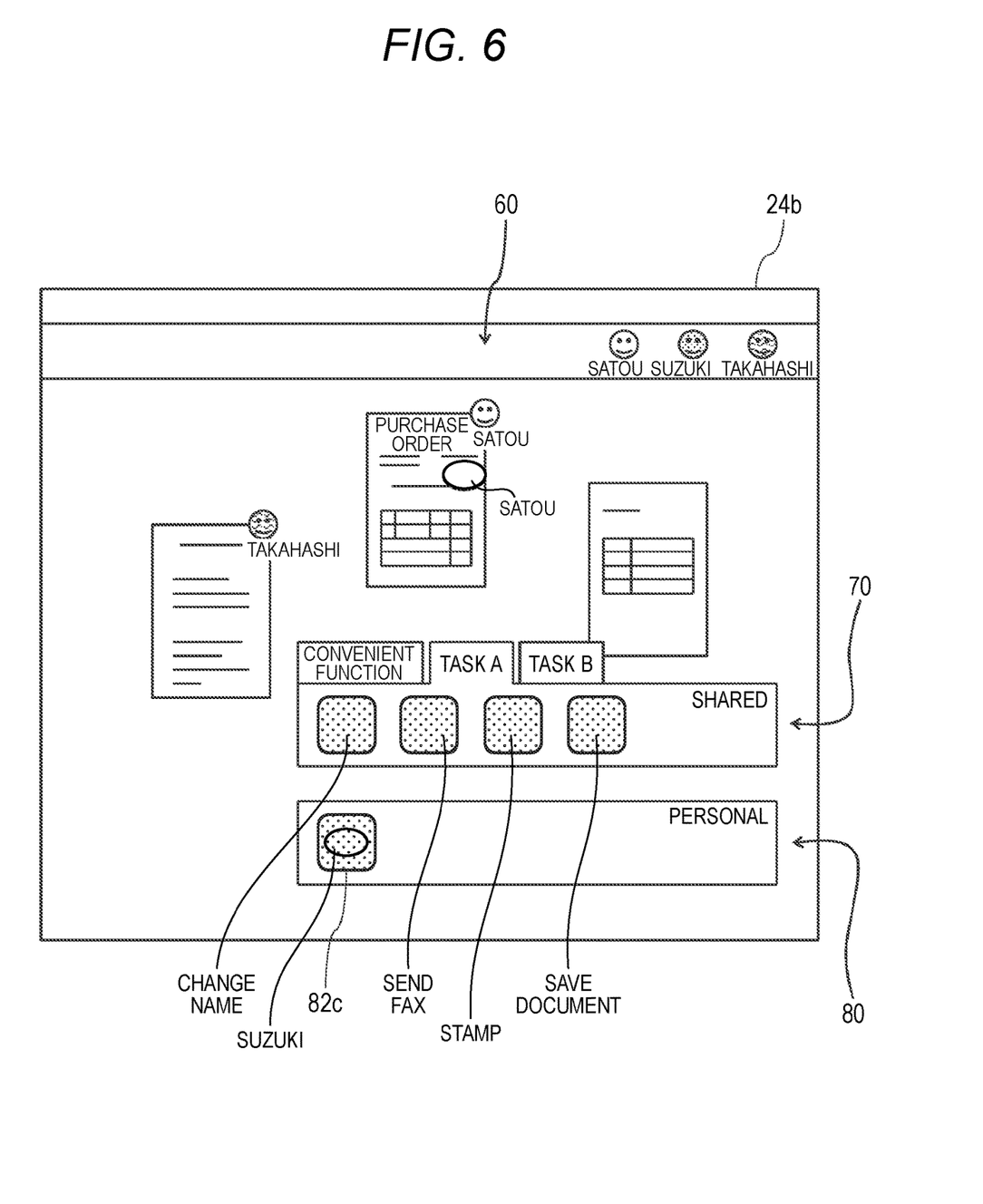
FIG. 6 is a diagram illustrating a display example of a shared work region window, a shared toolbar, and a personal toolbar in a second user terminal used by a second user.
Figure 7:
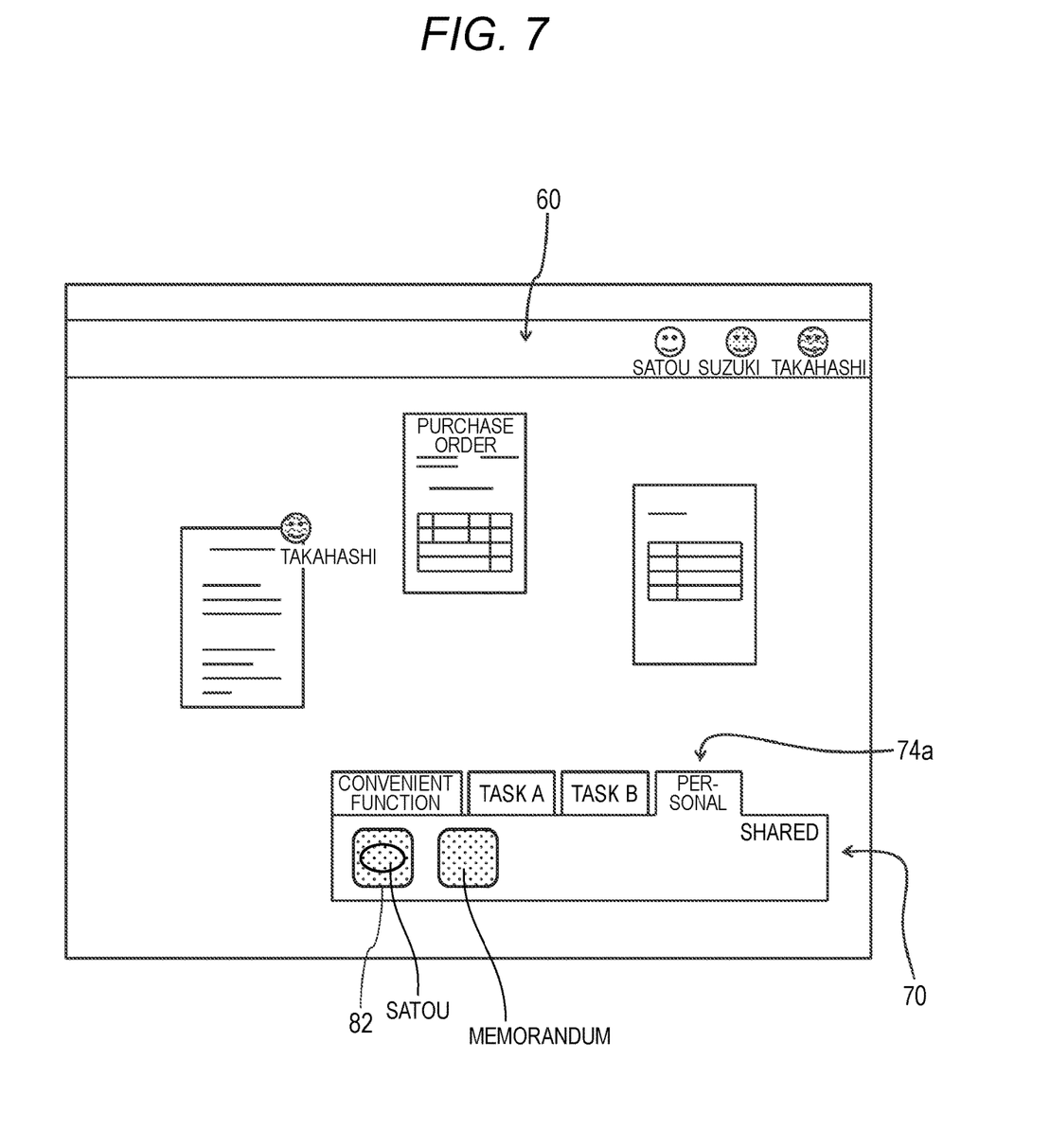
FIG. 7 is a diagram illustrating an example in which a personal operation button is displayed in one tab of a shared toolbar.

In the examples of FIGS. 5 and 6, the personal operation button 82 is included in the personal toolbar 80 that is displayed separately from the shared toolbar 70, and alternatively the personal operation button 82 may be included in one tab 74a in the shared toolbar 70 as illustrated in FIG. 7. Although the tab 74a is included in the shared toolbar 70, the tab 74a is not shared by other users as in the personal toolbar 80.

By including the personal operation button 82 in the tab 74a of the shared toolbar 70, it is not necessary to display the personal toolbar 80 in addition to the shared toolbar 70. Thus, display area is reduced accordingly and visibility of the shared work region window 60 is improved. In addition, by including the personal operation button 82 in the tab 74a, the user may grasp whether the user performs processing associated with the personal operation button 82 eventually or whether the user performs processing associated with the shared operation button 72. Specifically, if the tab 74a including the personal operation button 82 is displayed on the shared toolbar 70, it is possible to grasp that the processing associated with the personal operation button 82 is performed eventually, and if the tab 74 other than the tab 74a is displayed on the shared toolbar 70, it is possible to grasp that the processing associated with the shared operation button 72 is performed eventually.

In addition, each user may switch between display and non-display of his/her personal toolbar 80 (that is, the personal operation button 82). By setting the personal operation button 82 to non-display, it is possible to prevent the personal operation button 82 from being erroneously operated.

The work region providing unit 48 may determine, in accordance with an instruction from each user, in what mode the personal operation button 82 is to be displayed and whether to display the personal operation button 82. For example, the work region providing unit 48 sends an inquiry to each user to select whether to include and display the personal operation button 82 in the personal toolbar 80 independent of the shared toolbar 70, whether to include and display the personal operation button 82 in one tab 74a of the shared toolbar 70, or whether not to display the personal operation button 82, and determines a display mode (including non-display) of the personal operation button 82 based on an answer of the user to the inquiry.

Figure 8:
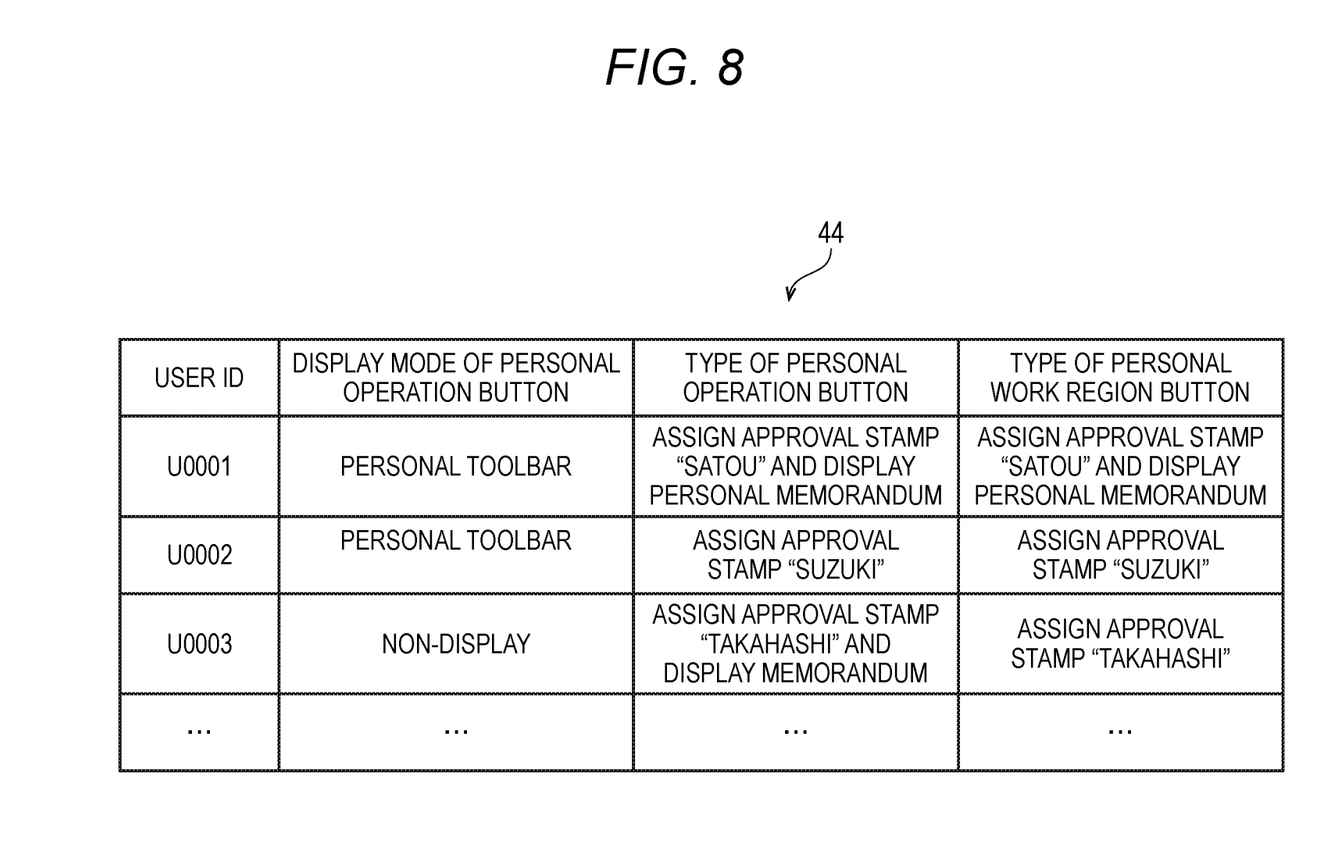
FIG. 8 is a conceptual table illustrating content of a user DB.

The work region providing unit 48 stores information on the personal operation button 82 for each user in the user DB 44 in the memory 42. FIG. 8 is a conceptual table illustrating content of the user DB 44. As illustrated in FIG. 8, in the user DB 44, a user ID indicating a user registered in the work region providing server 14, a display mode of the personal operation button 82 set by the user, and a type of the personal operation button 82 set by the user (content of processing associated with the personal operation button 82) are stored in association with one another. A type of a button used for the personal work region will be described later.

The work region providing unit 48 refers to the user DB 44, specifies the display mode of the personal operation button 82 for each user and the type of each personal operation button 82, and then displays the personal operation button 82 on the display 24 of the user terminal 12 of each user. When the user gives an instruction to change the display mode of the personal operation button 82 or the type of the personal operation button 82, the work region providing unit 48 updates content of the user DB 44 in accordance with the change instruction.

In addition, the work region providing unit 48 may determine whether to display the personal operation button 82 of a specific user among plural users accessing the same shared work region on the display 24 of the user terminal 12 used by the specific user, according to a display state of the personal operation button 82 of a user other than the specific user among the plural users.

For example, the work region providing unit 48 refers to the user DB 44, and displays the personal operation button 82 of the specific user on the display 24 of the user terminal 12 of the specific user, regardless of display mode setting of the personal operation button 82 of the specific user, when display mode setting of the personal operation button 82 of all the users except the specific user among users that access the same shared work region as the specific user is setting of displaying the personal operation button 82. This is because, if another user who accesses the same shared work region displays the personal operation button 82, it is considered that there is a high possibility that it is necessary for each user to perform a personal task in the shared work region. In the present exemplary embodiment, the work region providing unit 48 refers to the user DB 44, and displays the personal operation button 82 of the specific user when the display mode setting of the personal operation button 82 of all the users except the specific user among the users that access the same shared work region as the specific user is setting of displaying the personal operation button 82. Alternatively, when the display mode setting of the personal operation button 82 of a predetermined proportion or more of users except the specific user among the users that access the same shared work region as the specific user is setting of displaying the personal operation button 82, the work region providing unit 48 may display the personal operation button 82 of the specific user.

On the other hand, the work region providing unit 48 refers to the data base BD 44, and determines the display mode of the personal operation button 82 of the specific user in accordance with the display mode setting of the personal operation button 82 of the specific user when the display mode setting of the personal operation button 82 of all the users except the specific user (or users except the specific user being less than the predetermined proportion) among the users that access the same shared work region as the specific user is non-display of the personal operation button 82.

When a title assigned to the shared toolbar 70 or the shared operation button 72, which is a shared operation element displayed together with the shared work region window 60, indicates work specific to a user, the work region providing unit 48 may cause the personal operation button 82 to be displayed on the displays 24 of the user terminals 12 of plural users accessing the shared work region.

Figure 9:
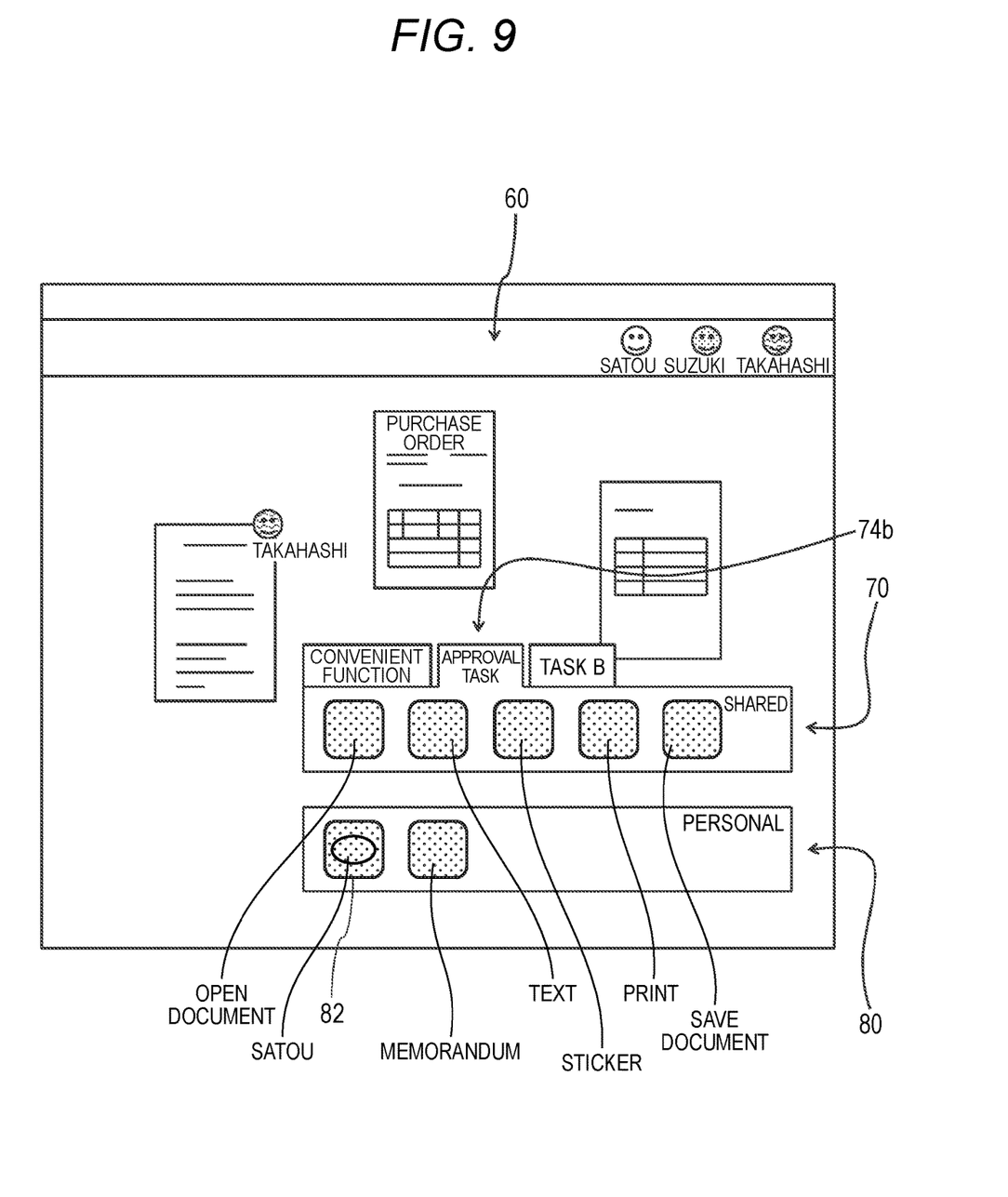
FIG. 9 is a diagram illustrating an example in which a personal toolbar is displayed in accordance with a title of a shared toolbar.

For example, as illustrated in FIG. 9, when a title of a tab 74b of the shared toolbar 70 is "approval task", it may be said that there is a high possibility that approval processing is performed in the shared work region window 60. Further, in many cases, the approval processing includes a personal task. Therefore, in such a case, the work region providing unit 48 causes the personal operation button 82 (in the example of FIG. 9, the personal toolbar 80 including the personal operation button 82) to be displayed on the displays 24 of the user terminals 12 of the plural users who access the shared work region. A name indicating a personal task is not limited to a name containing "approval", and may be a title containing "confirmation", for example. Similarly, when the title indicating a personal task is a title other than that of the tab 74 of the shared toolbar 70 (for example, a title of the shared operation button 72), the work region providing unit 48 causes the personal operation button 82 to be displayed on the display 24 of each user terminal 12. When the title of the tab 74b of the shared toolbar 70 indicates a personal task, the work region providing unit 48 may cause the personal operation button 82 to be displayed on the displays 24 of the user terminals 12 of plural users accessing the shared work region, at a timing when the tab 74b is selected by any one of the users accessing the shared work region.

As described above, the work region providing unit 48 provides a user with the shared work region or the personal work region according to the selection of the user. On the display screen displayed on the display 24 of the user terminal 12 when the user accesses the personal work region, a personal work region window and a personal work region operation button serving as a personal work region operation element are displayed.

Figure 10:
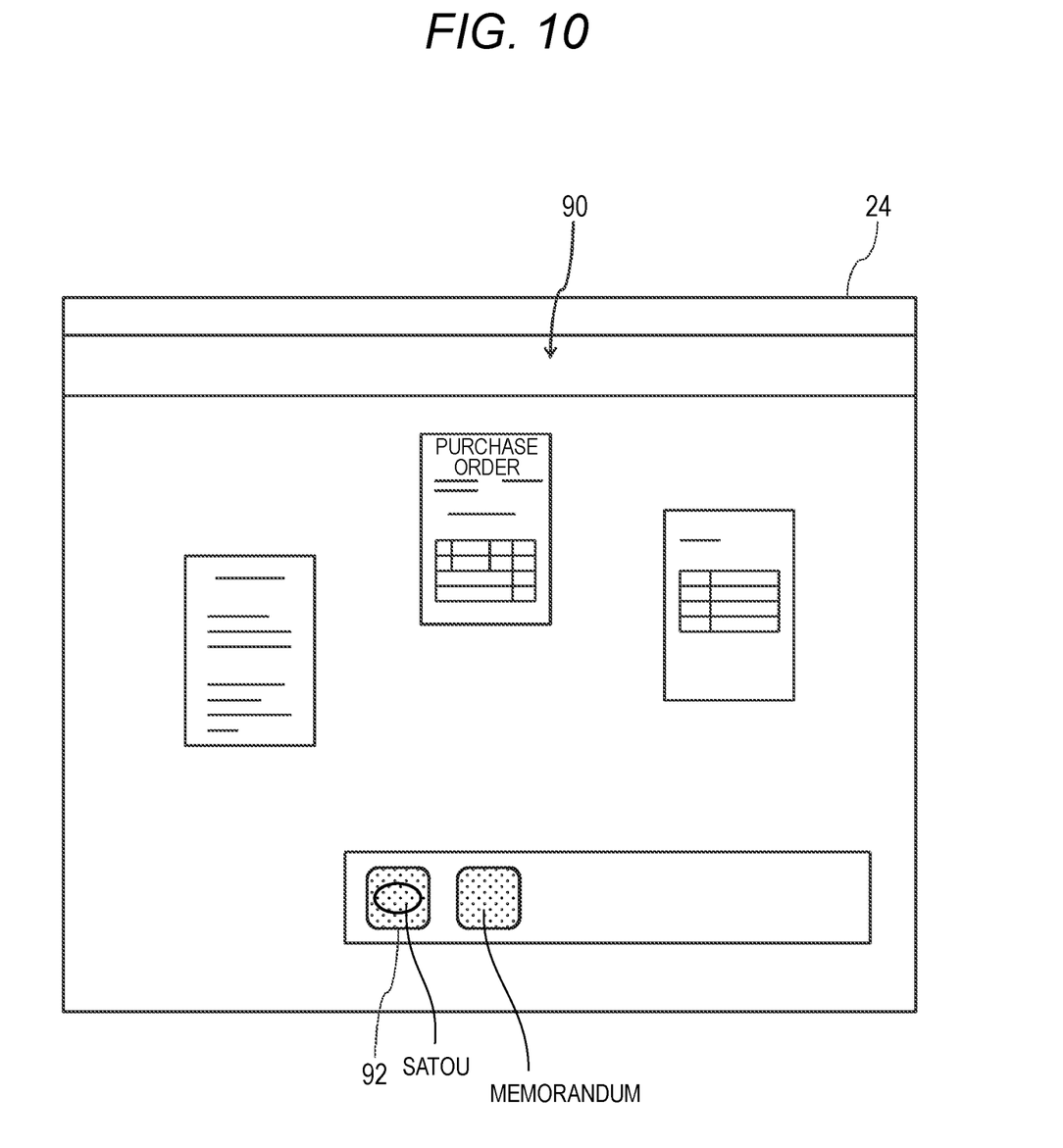
FIG. 10 is a diagram illustrating a display example of a personal work region window and a personal work region operation button.

FIG. 10 is a diagram illustrating a display example of a personal work region window 90 and a personal work region operation button 92. Since the personal work region window 90 has substantially the same content as that of the shared work region window 60 shown in FIG. 4, for example, a detailed description thereof will be omitted. However, as a matter of course, since the personal work region window 90 is not shared by plural users, the icons 64 and 66 (see FIG. 4) are not displayed in the personal work region window 90.

Since the personal work region operation button 92 is also user-dedicated, each user may determine content of processing associated with the personal work region operation button 92 by himself/herself. In other words, the work region providing unit 48 may determine content of an instruction input through the personal work region operation button 92 of a user in accordance with an instruction from the user. Since the personal work region operation button 92 is not shared by plural users, the personal work region operation button 92 may be associated with processing related to a personal task that is work specific to the user. A type of the personal work region operation button 92 of each user (the content of the processing associated with the personal work region operation button 92) is stored in the user DB 44 in association with a user ID indicating the user (see FIG. 8).

Here, the personal operation button 82 (see FIG. 5 and the like) displayed together with the shared work region window 60 on the display 24 of the user terminal 12 used by a user who accesses the shared work region may include an operation element of the same type as the personal work region operation button 92 that is displayed on the display 24 when the user accesses the personal work region. In this way, the user may perform, in the shared work region, a personal task that may not be performed before the user moves a former electronic document to the personal work region temporarily.

In particular, the personal operation button 82 may be of exactly the same type as the personal work region operation button 92. Accordingly, since the user may use the personal operation button 82 of exactly the same type as the personal work region operation button 92 in the shared work region, the user may perform work related to an electronic document in the shared work region in the same manner as performing the work in his/her own personal work region. In this case, it is not necessary to store information indicating the type of the personal operation button 82 in the user DB 44, and the work region providing unit 48 may cause the personal operation button 82 of each user to be displayed based on the type of the personal work region operation button 92 that is stored in the user DB 44.

An outline of the work region providing server 14 according to the present exemplary embodiment is as described above. According to the present exemplary embodiment, different types of personal operation buttons 82 are displayed among plural users who access the same shared work region. Accordingly, each user may immediately operate the personal operation button 82 without performing an unnecessary operation. In particular, by displaying the personal operation button 82 dedicated to a user together with the shared work region window 60, for example, it is not necessary to temporarily move an electronic document related to the thumbnail T displayed in the document display region 62 to the personal work region, and it is possible to perform work related to a personal task of the user on the electronic document in the shared work region window 60.

Figure 11:
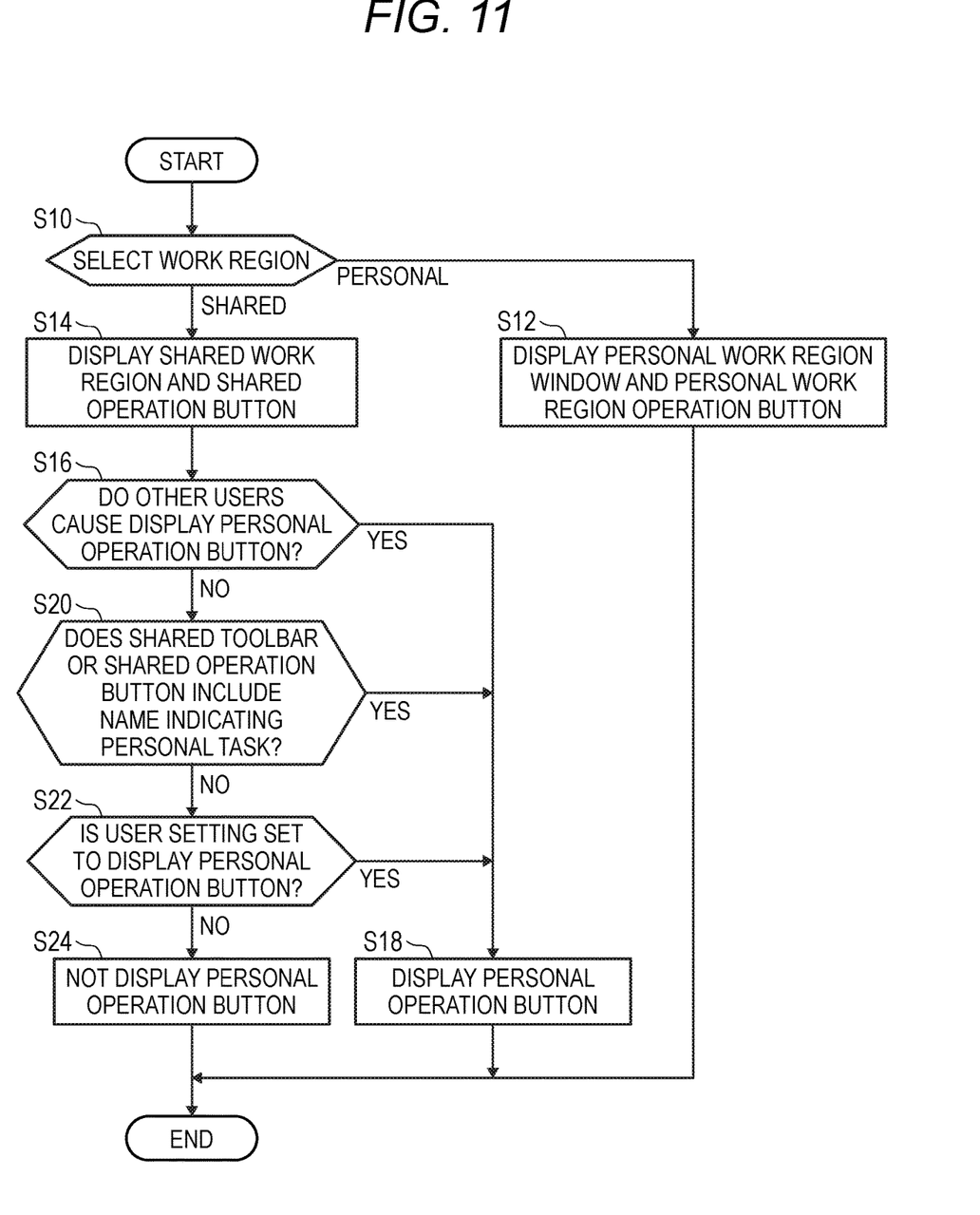
FIG. 11 is a flowchart illustrating a flow of processing of a server.

Hereinafter, a flow of processing of the work region providing unit 48 will be described with reference to a flowchart illustrated in FIG. 11.

In step S10, a user obtains authentication from the work region providing server 14, and then accesses a shared work region or a personal work region.

The process proceeds to step S12 when the user accesses a personal work region. In step S12, the work region providing unit 48 causes the personal work region window 90 and the personal work region operation button 92 to be displayed on the display 24 of the user terminal 12 of the user. In this case, the user performs work related to an electronic document in the personal work region dedicated to the user.

The process proceeds to step S14 when the user accesses a shared work region. In step S14, the work region providing unit 48 causes the shared work region window 60 and the shared operation button 72 to be displayed on the display 24 of the user terminal 12 of the user. Here, it is assumed that the shared toolbar 70 including the shared operation button 72 is displayed.

In step S16, the work region providing unit 48 refers to the user DB 44, and determines whether all of the other users accessing the shared work region accessed by the user cause the personal operation button 82 to be displayed.

The process proceeds to step S18 when all the other users display the personal operation button 82. In step S18, the work region providing unit 48 causes the shared work region window 60 and the shared operation button 72 as well as the personal operation button 82 to be displayed on the display 24 of the user terminal 12 of the user.

When any one of the other users does not display the personal operation button 82, the process proceeds to step S20, and in step S20, the work region providing unit 48 determines whether a title indicating a personal task is included in titles of the shared toolbar 70 or the shared operation button 72 displayed in step S14. When the title indicating a personal task is included in the titles of the shared toolbar 70 or the shared operation button 72, the process proceeds to step S18.

The process proceeds to step S22 when the title indicating a personal task is not included in titles of the shared toolbar 70 or the shared operation button 72. In step S22, the work region providing unit 48 refers to a display mode of the personal operation button 82 set by the user in the user DB 44, and determines whether user setting is setting of displaying the personal operation button 82. When the user setting is setting of displaying the personal operation button 82, the process proceeds to step S18.

The process proceeds to step S24 when the user setting is not setting of displaying the personal operation button 82. In step S24, the work region providing unit 48 does not cause the personal operation button 82 to be displayed on the display 24 of the user terminal 12 of the user.

Although the exemplary embodiment according to the present disclosure is described above, the present disclosure is not limited to the above-described exemplary embodiment, and various modifications may be made without departing from the gist of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a processor configured to display, on a display screen of a terminal device used by a user:
    a shared work region as a common work region that is accessed by a plurality of users, including the user, and that enables the plurality of users to execute work in cooperation,
    an operation element having a first operation element type or a second operation element type,
    the first operation element type for the user of the terminal device to input a first instruction related to work in the shared work region, the first operation element type being shared and useable by each of the plurality of users of the shared work region, and
    the second operation element type, being different from the first operation element type, provided for the user, the second operation element type
    (i) being for inputting a second instruction of work, the second instruction being specific to the user,
    (ii) not being shared by each of the plurality of users of the shared work region, and
    (iii) being displayed on the display screen of the terminal device used by the user for only the user, wherein
    the processor displays the first operation element type and the second operation element type on the display screen in a selectable manner, and
    the processor is further configured to determine, in accordance with the first instruction or the second instruction from the user, content of the first instruction or the second instruction through input through the operation element of the user.

2. The information processing apparatus according to claim 1, wherein the processor is configured to determine, in accordance with a third instruction from the user, whether to display the operation element having the first operation element type or the second operation element type on the display screen of the terminal device used by the user.

3. The information processing apparatus according to claim 2,
    wherein the processor is configured to determine whether to display the second operation element type of the user on the display screen of the terminal device used by the user, according to a display state of operation elements of other users of the plurality of users other than the user.

4. The information processing apparatus according to claim 1, wherein the processor is configured to determine, in accordance with a third instruction from the user, whether to display the operation element of the first operation element type or the second operation element type on the display screen of the terminal device used by the user.

5. The information processing apparatus according to claim 4,
wherein the processor is configured to determine whether to display the second operation element type of the user on the display screen of the terminal device used by the user, according to a display state of operation elements of other users other than the user.

6. The information processing apparatus according to claim 1,
wherein the processor is configured to
display the operation element having the second operation element type on the display screen when a title assigned to the operation element indicates work specific to the user.

7. The information processing apparatus according to claim 1,
wherein the processor is configured to provide each user with a personal work region that is a work region dedicated to the user, and
wherein the operation element displayed on the display screen of the terminal device used by the user has a same type whether displayed when the user accesses the personal work region or when displayed when the user accesses the shared work region.

8. The information processing apparatus according to claim 1, wherein the processor is further configured to:
authenticate the user by authentication processing; and
when the operation element is the second operation element type, determine a content of the operation element based on a user ID associated with the authenticated user.

9. The information processing apparatus according to claim 1, wherein the processor is further configured to:
determine whether all other users accessing the shared work region have operation elements of the second operation element type displayed; and
when all other users accessing the shared work region have respective operation elements of the second operation element type displayed, display the operation element of the second operation element type for the user on the display screen when the user selects the shared work region.

10. A non-transitory computer readable medium storing a program causing a computer to execute an information processing comprising:
displaying, on a display screen of a terminal device used by a user:
a shared work region as a common work region that is accessed by a plurality of users, including the user, and that enables the plurality of users to execute work in cooperation,
an operation element having a first operation element type or a second operation element type, the first operation element type for the user using the terminal device to input a first instruction related to work in the shared work region, the first operation element type being shared and useable by each of the plurality of users of the shared work region, and the second operation element type, being different from the first operation element type, provided for the user, the second operation element type
(i) being for inputting a second instruction of work, the second instruction being specific to the user,
(ii) not being shared by each of the plurality of users of the shared work region, and
(iii) being displayed on the display screen of the terminal device used by the user for only the user, wherein
the first operation element type and the second operation element type are displayed on the display screen in a selectable manner, and
the information processing further including determining, in accordance with the first instruction or the second instruction from the user, content of the first instruction or the second instruction through input through the operation element of the user.

11. An information processing method comprising:
displaying, on a display screen of a terminal device used by a user:
a shared work region as a common work region that is accessed by a plurality of users, including the user, and that enables the plurality of users to execute work in cooperation,
an operation element having a first operation element type or a second operation element type, the first operation element type for the user using the terminal device to input a first instruction related to work in the shared work region, the first operation element type being shared and useable by each of the plurality of users of the shared work region, and
the second operation element type, being different from the first operation element type, provided for the user, the second operation element type
(i) being for inputting a second instruction of work, the second instruction being specific to the user,
(ii) not being shared by each of the plurality of users of the shared work region, and
(iii) being displayed on the display screen of the terminal device used by the user for only the user, wherein
the first operation element type and the second operation element type are displayed on the display screen in a selectable manner, and
the method further including determining, in accordance with the first instruction or the second instruction from the user, content of the first instruction or the second instruction through input through the operation element of the user.

* * * * *